(12) United States Patent
Kiguchi et al.

(10) Patent No.: US 12,095,287 B2
(45) Date of Patent: Sep. 17, 2024

(54) DYNAMIC WIRELESS POWER TRANSFER SYSTEM

(71) Applicant: DENSO CORPORATION, Kariya (JP)

(72) Inventors: Takuya Kiguchi, Kariya (JP); Nobuhisa Yamaguchi, Kariya (JP); Eisuke Takahashi, Kariya (JP); Hayato Sumiya, Kariya (JP); Tomoyuki Fujikawa, Kariya (JP); Koji Mazaki, Kariya (JP); Shimpei Takita, Kariya (JP); Masaki Kanesaki, Kariya (JP); Masaya Takahashi, Kariya (JP); Kazuhiro Uda, Kariya (JP); Yusei Nakayashiki, Kariya (JP); Mitsuru Shibanuma, Kariya (JP); Kazuyoshi Obayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 355 days.

(21) Appl. No.: 17/460,479

(22) Filed: Aug. 30, 2021

(65) Prior Publication Data

US 2021/0391757 A1 Dec. 16, 2021

Related U.S. Application Data

(63) Continuation of application No. PCT/JP2020/000879, filed on Jan. 14, 2020.

(30) Foreign Application Priority Data

Feb. 28, 2019 (JP) .................................. 2019-035178

(51) Int. Cl.
*H02J 50/40* (2016.01)
*B60L 5/42* (2006.01)
(Continued)

(52) U.S. Cl.
CPC .............. *H02J 50/402* (2020.01); *B60L 5/42* (2013.01); *E01F 11/00* (2013.01); *H01F 27/245* (2013.01);
(Continued)

(58) Field of Classification Search
CPC .. B60L 5/42; B60L 5/005; B60L 50/60; B60L 53/12; B60L 50/53; B60L 53/22;
(Continued)

(56) References Cited

U.S. PATENT DOCUMENTS 8,164,222 B2 * 4/2012 Baarman ................. H02J 50/80
307/104
8,517,126 B2 * 8/2013 Atarashi ................. H02J 50/12
320/108

(Continued)

FOREIGN PATENT DOCUMENTS

JP 2006335289 A * 12/2006 ............. Y02T 10/72
JP 2011200052 A * 10/2011 ............. B60L 11/182
(Continued)

OTHER PUBLICATIONS

Mar. 17, 2020 Search Report issued in International Patent Application No. PCT/JP2020/000879.

*Primary Examiner* — M Baye Diao
(74) *Attorney, Agent, or Firm* — Oliff PLC

(57) ABSTRACT

A dynamic wireless power transfer system performs, through a plurality of primary coils installed along a traveling direction of a road and a secondary coil mounted in a vehicle, power transfer to the vehicle while the vehicle is traveling. The secondary coil is an M-phase coil including M coils, M denoting an integer which is two or higher. The M coils each include a coil end extending along a front-rear direction of the vehicle and a main coil portion extending along a width direction of the vehicle, the M coils each being (Continued)

configured such that a magnetic resistance of a magnetic path where a magnetic flux of the coil end passes is higher than a magnetic resistance of a magnetic path where a magnetic flux of the main coil portion passes.

9 Claims, 8 Drawing Sheets

(51) Int. Cl.
*E01F 11/00* (2006.01)
*H01F 27/245* (2006.01)
*H01F 27/36* (2006.01)
*H02J 50/10* (2016.01)

(52) U.S. Cl.
CPC ............ *H01F 27/363* (2020.08); *H02J 50/10* (2016.02); *H02J 2310/48* (2020.01)

(58) Field of Classification Search
CPC ...... B60L 58/20; H01F 27/245; H01F 27/363; H01F 27/366; H01F 38/14; H02J 50/01; H02J 50/402; H02J 50/10; H02J 2310/48; H02J 50/90; E01F 11/00
See application file for complete search history.

(56) References Cited

U.S. PATENT DOCUMENTS

| | | | |
|---|---|---|---|
| 10,112,495 B2* | 10/2018 | Elshaer | B60L 53/12 |
| 10,538,165 B2* | 1/2020 | Dadras | H02J 50/90 |
| 10,692,650 B2* | 6/2020 | Zhi | H01F 27/263 |
| 2009/0106567 A1* | 4/2009 | Baarman | H02J 50/80 |
| | | | 307/104 |
| 2013/0009462 A1 | 1/2013 | Amano et al. | |
| 2015/0084406 A1 | 3/2015 | Czainski et al. | |
| 2018/0250999 A1* | 9/2018 | Golin | B60L 53/32 |

FOREIGN PATENT DOCUMENTS

| | | |
|---|---|---|
| JP | 2014-230474 A | 12/2014 |
| JP | 2015-211538 A | 11/2015 |

* cited by examiner

DYNAMIC WIRELESS POWER TRANSFER SYSTEM

CROSS-REFERENCE TO RELATED APPLICATION

The present application is based on and claims the benefit of priority from earlier Japanese Patent Application No. 2019-035178 filed Feb. 28, 2019, the description of which is incorporated herein by reference.

BACKGROUND

Technical Field

The present disclosure relates to a technique for wireless power transfer to a vehicle that is traveling.

Related Art

A technique for wireless power transfer to a vehicle that is traveling is disclosed. In this typical technique, a primary coil installed in a road and a secondary coil mounted in the vehicle are each configured as a three-phase coil.

SUMMARY

As an aspect of the present disclosure, a dynamic wireless power transfer system is provided which is configured to perform, through a plurality of primary coils installed along a traveling direction of a road and a secondary coil mounted in a vehicle, power transfer to the vehicle while the vehicle is traveling. The secondary coil is an M-phase coil including M coils, M denoting an integer which is two or higher. The M coils each include a coil end extending along a front-rear direction of the vehicle and a main coil portion extending along a width direction of the vehicle, the M coils each being configured such that a magnetic resistance of a magnetic path where a magnetic flux of the coil end passes is higher than a magnetic resistance of a magnetic path where a magnetic flux of the main coil portion passes.

DETAILED DESCRIPTION OF THE PREFERRED EMBODIMENTS

Japanese Translation of PCT International Application Publication No. 2015-521456 discloses a technique for wireless power transfer to a vehicle that is traveling. In this typical technique, a primary coil installed in a road and a secondary coil mounted in the vehicle are each configured as a three-phase coil.

However, a technique enabling further reduction in power ripple is demanded.

The present disclosure has been made to solve at least part of the above-described problem and can be implemented as the following embodiments or application examples.

Figure 1:
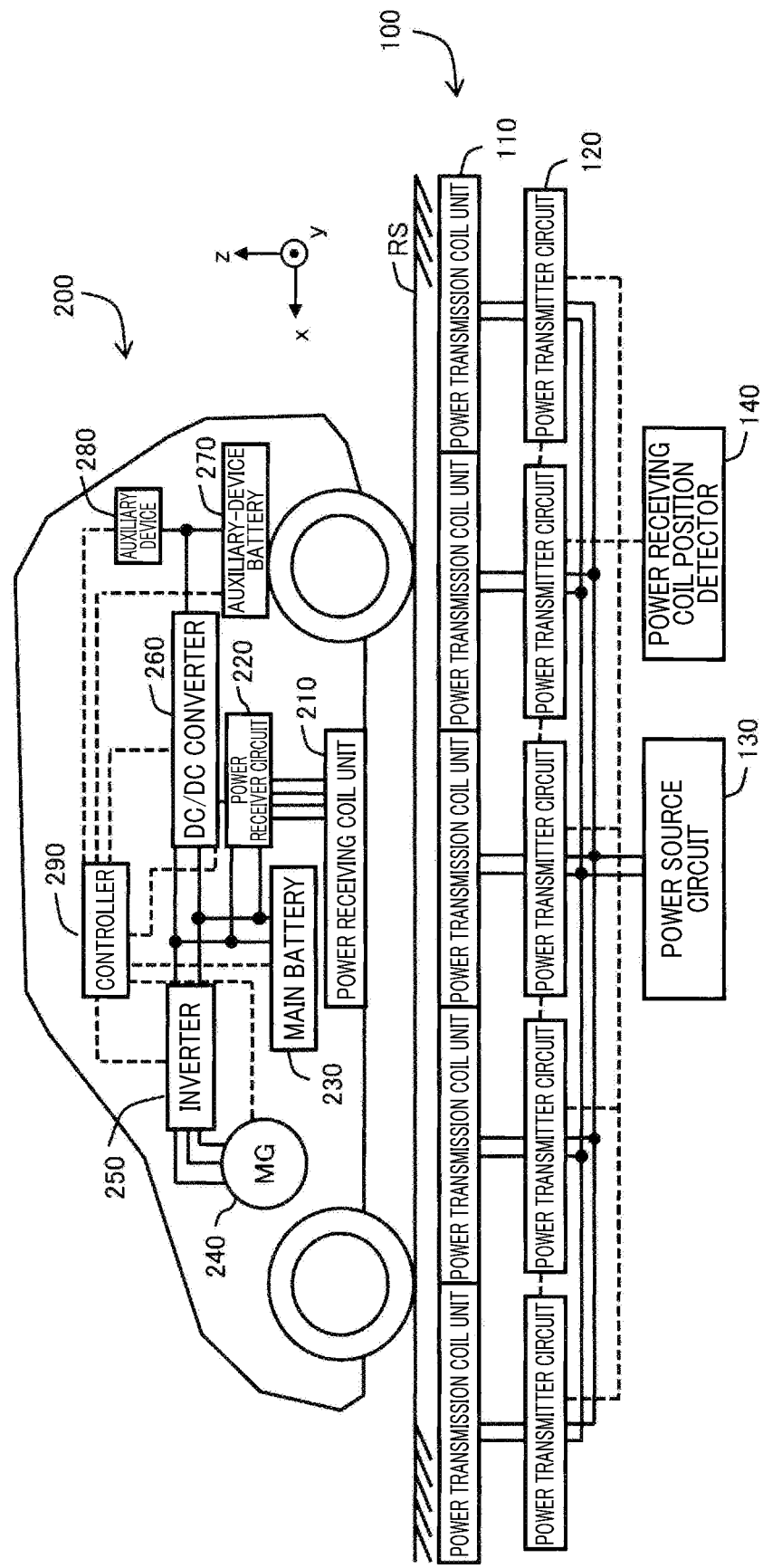
FIG. 1 is a block diagram illustrating an overall configuration of a dynamic wireless power transfer system.

As illustrated in FIG. 1, a dynamic wireless power transfer system, which includes a wireless power transfer device 100 installed in a road RS and a vehicle 200 that is to travel on the road RS, enables power transfer from the wireless power transfer device 100 to the vehicle 200 while the vehicle 200 is traveling. The vehicle 200 is configured as, for example, an electric vehicle or a hybrid vehicle. In FIG. 1, an x-axis direction represents a traveling direction or a front-rear direction of the vehicle 200, a y-axis direction represents a width direction of the vehicle 200, and a z-axis direction is a vertically upward direction. The x, y, and z-axis directions in other figures described later represent the same directions as in FIG. 1. The wireless power transfer device 100 includes a plurality of power transmission coil units 110, a plurality of power transmitter circuits 120 that supply an alternating-current voltage to the plurality of power transmission coil units 110, a power source circuit 130 that supplies a direct-current voltage to the plurality of power transmitter circuits 120, and a power receiving coil position detector 140.

The plurality of power transmission coil units 110 are arranged along the traveling direction on the road RS. The power transmission coil units 110 include respective primary coils. The primary coils are also referred to as "power transmission coils." A specific configuration example of the power transmission coil units 110 will be described later. The primary coils are not necessarily provided as the power transmission coil units 110 and it is only necessary that a plurality of primary coils are installed along the traveling direction on the road RS. The plurality of power transmitter circuits 120 are inverter circuits that convert a direct-current voltage supplied from the power source circuit 130 to a high-frequency alternating-current voltage and apply the voltage to the primary coils of the power transmission coil units 110. The power source circuit 130 is a circuit that supplies a direct-current voltage to the power transmitter circuits 120. For example, the power source circuit 130 is configured as an AC/DC converter circuit that rectifies an alternating-current voltage from an external power source and outputs a direct-current voltage. The direct-current voltage outputted from the power source circuit 130 does not need to be a complete direct-current voltage and may contain some fluctuation (ripple).

The power receiving coil position detector 140 detects a position of a power receiving coil unit 210 mounted in the vehicle 200. The power receiving coil position detector 140 may detect the position of the power receiving coil unit 210 from, for example, a magnitude of a transmission power or a transmission current of the plurality of power transmitter circuits 120 or may detect the position of the power receiving coil unit 210 through wireless communication with the vehicle 200 or by using a position sensor that detects a position of the vehicle 200. The plurality of power transmitter circuits 120 perform power transmission through one or more of the power transmission coil units 110 close to the power receiving coil unit 210 in accordance with the position of the power receiving coil unit 210 detected by the power receiving coil position detector 140. The vehicle 200 includes the power receiving coil unit 210, a power receiver circuit 220, a main battery 230, a motor generator 240, an inverter circuit 250, a DC/DC converter circuit 260, an auxiliary-device battery 270, an auxiliary device 280, and a controller 290.

The power receiving coil unit 210, which includes a secondary coil, is a device that generates induced electromotive force by virtue of electromagnetic induction between the secondary coil and the primary coils of the power transmission coil units 110. The secondary coil is also referred to as a "power receiving coil." The power receiver circuit 220 is a circuit that converts an alternating-current voltage outputted from the power receiving coil unit 210 to a direct-current voltage suitable for charging the main battery 230. For example, the power receiver circuit 220 is configured as a circuit including a rectifier circuit that converts an alternating-current voltage to a direct-current voltage and a DC/DC converter circuit that boosts the direct-current voltage.

In addition to being usable for charging the main battery 230, the direct-current voltage outputted from the power receiver circuit 220 can be used for charging the auxiliary-device battery 270 and for driving the motor generator 240 and driving the auxiliary device 280. The main battery 230 is a secondary battery that outputs a relatively high direct-current voltage for driving the motor generator 240. The motor generator 240 operates as a three-phase alternating-current motor, generating a driving force for the vehicle 200 to travel. The motor generator 240 operates as a generator while the vehicle 200 is decelerated, generating a three-phase alternating-current voltage.

While the motor generator 240 operates as a motor, the inverter circuit 250 converts the direct-current voltage from the main battery 230 to a three-phase alternating-current voltage and supplies the three-phase alternating-current voltage to the motor generator 240. While the motor generator 240 operates as a generator, the inverter circuit 250 converts the three-phase alternating-current voltage outputted from the motor generator 240 to a direct-current voltage and supplies the direct-current voltage to the main battery 230.

The DC/DC converter circuit 260 converts the direct-current voltage from the main battery 230 to a lower direct-current voltage and supplies the lower direct-current voltage to the auxiliary-device battery 270 and the auxiliary device 280. The auxiliary-device battery 270 is a secondary battery that outputs a relatively low direct-current voltage for driving the auxiliary device 280. The auxiliary device 280 is a peripheral device such as an air conditioner or an electric power steering device.

The controller 290 controls units in the vehicle 200. In receiving dynamic wireless power transfer, the controller 290 performs power reception by controlling the power receiver circuit 220.

Figure 2A:
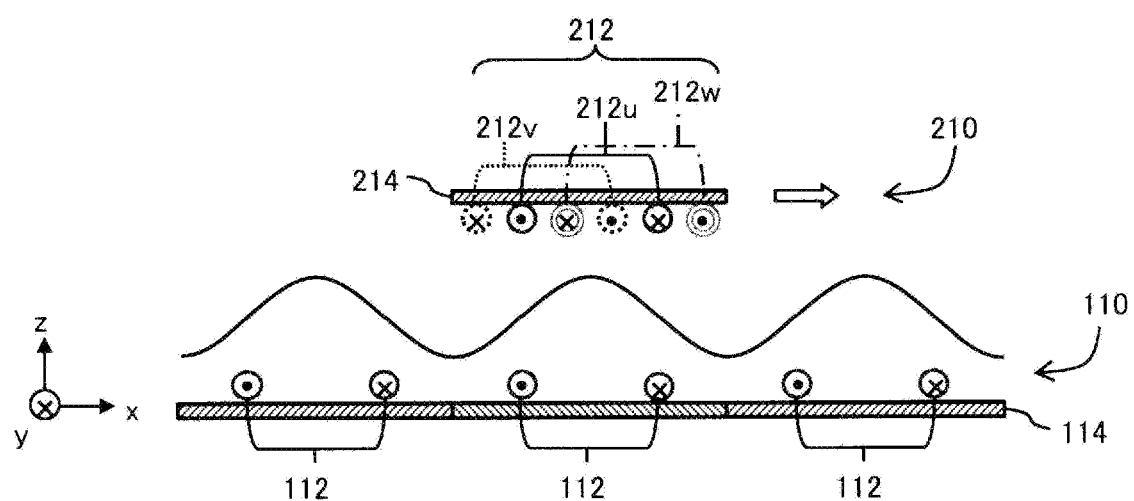
FIG. 2A is a diagram explaining a coil configuration with a single-phase primary coil and a three-phase secondary coil.

As illustrated in FIG. 2A, the power transmission coil units 110 each include a primary coil 112 and a magnetic yoke 114. The power receiving coil unit 210 includes a secondary coil 212 and a magnetic yoke 214. In this example, the primary coil 112 is configured as a single-phase coil. The secondary coil 212 is configured as a three-phase coil including a U-phase coil 212*u*, a V-phase coil 212*v*, and a W-phase coil 212*w*. The three coils 212*u*, 212*v*, and 212*w* are star-connected or delta-connected. The coils 212*u*, 212*v*, and 212*w* are each configured as a concentrated winding coil the number of turns of which is two or more; however, they are drawn in a simplified manner in FIG. 2A. A filled circle "●" and an x mark "x" in a circle representing a coil wire of each coil indicate opposite current directions. The same applies to other figures described later.

The magnetic yokes 114 and 214, which are so-called back yokes, are used to enhance magnetic flux densities around the coils 112 and 212. The magnetic yoke 114 of the power transmission coil unit 110 is disposed behind the primary coil 112. The "behind the primary coil 112" means the opposite side to a gap between the primary coil 112 and the secondary coil 212. Likewise, the magnetic yoke 214 of the power receiving coil unit 210 is disposed behind the secondary coil 212.

Magnetic cores may be provided to the primary coil 112 and the secondary coil 212 in addition to the magnetic yokes 114 and 214. Further, respective magnetic shields of a non-magnetic metal may be provided behind the magnetic yokes 114 and 214.

In FIG. 2A, a voltage waveform provided by the primary coil 112 is drawn. A frequency of an alternating-current voltage to be applied to the primary coil 112 is set to a frequency that is high enough for the secondary coil 212 to be considered to be substantially not in operation in terms of power transmission from the primary coil 112 to the secondary coil 212 even while the vehicle 200 is traveling. In FIG. 2A, with the assumption that the secondary coil 212 moves in the x-direction (the right direction) at a constant speed, a movement frequency $f_{212}$ of the secondary coil 212 can be calculated by the following expression.

$$f_{212} = 1/\{p_{112}/v_{212}\} \quad (1)$$

where, $p_{112}$ is a pitch [m] of the primary coil 112 and $v_{212}$ is a movement speed [m/s] of the secondary coil 212.

The movement frequency $f_{212}$ can be considered as a frequency at the time when the secondary coil 212 moves forward along an arrangement direction of the plurality of primary coils 112. For example, in a case where the movement frequency $f_{212}$ of the secondary coil 212 for dynamic wireless power transfer is in a range from several tens of Hz to several hundreds of Hz, the frequency of the alternating-current voltage to be applied to the primary coil 112 is set to a value in a range from several tens of kHz to several hundreds of kHz. Thus, by virtue of the frequency of the alternating-current voltage to be applied to the primary coil 112 being set to a value that is sufficiently larger than the movement frequency $f_{212}$ of the secondary coil 212, the secondary coil 212 can be considered to be substantially not in operation in terms of power transmission from the primary coil 112 to the secondary coil 212 even while the vehicle 200 is traveling. However, a relative position relationship between the primary coil 112 and the secondary coil 212 changes with the travel of the vehicle 200, causing fluctuation (power ripple) in the transmission power. The power ripple will be described later.

Figure 2B:
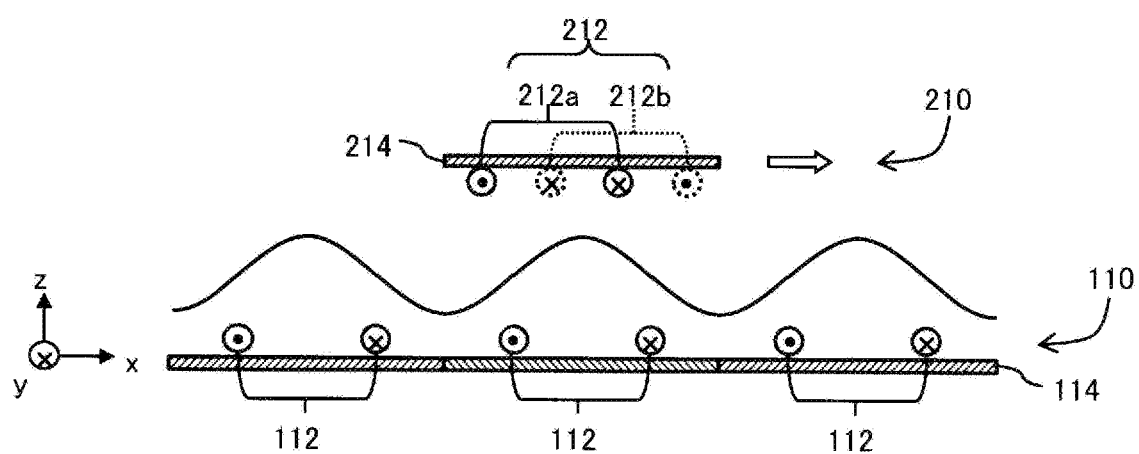
FIG. 2B is a diagram explaining a coil configuration with a single-phase primary coil and a two-phase secondary coil.

As illustrated in FIG. 2B, the secondary coil 212 may be a two-phase coil including an A-phase coil 212a and a B-phase coil 212b. Further, the number of phases M of the secondary coil 212 may be set to an integer exceeding three. However, the number of phases M is usually a prime number. Although being a single-phase coil in FIG. 2A and FIG. 2B, the primary coil 112 may be a multi-phase coil the number of phases of which is two or more. However, by virtue of the primary coil 112 being configured as a single-phase coil, dynamic power transfer can be performed by a simple configuration with less power ripple as compared with a case where the primary coil 112 and the secondary coil 212 are both multi-phase coils.

Figure 3A:
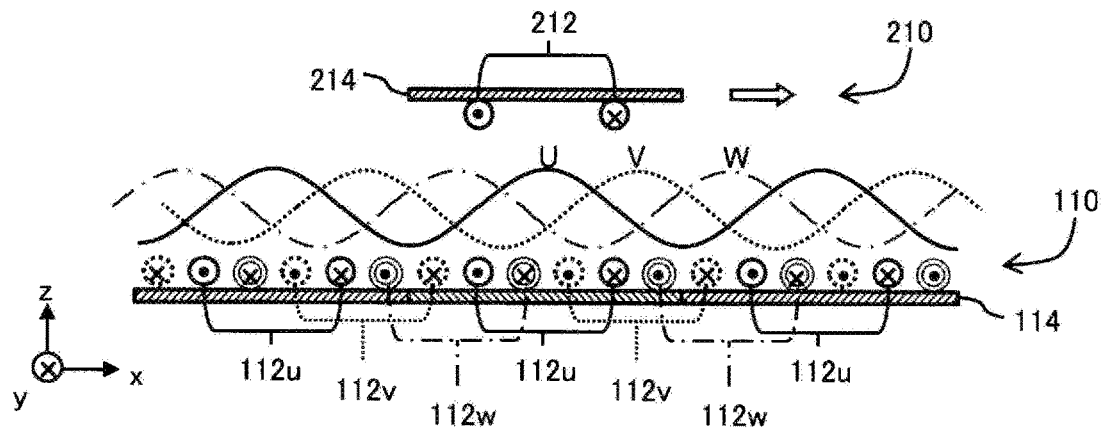
FIG. 3A is a diagram explaining inverter output with a multi-phase primary coil and a single-phase secondary coil.
Figure 3A:
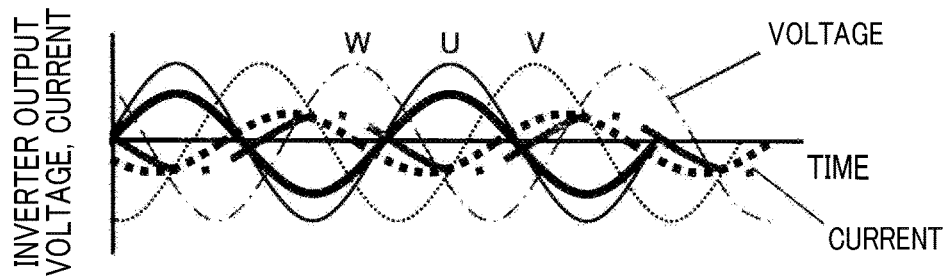
Figure 3B:
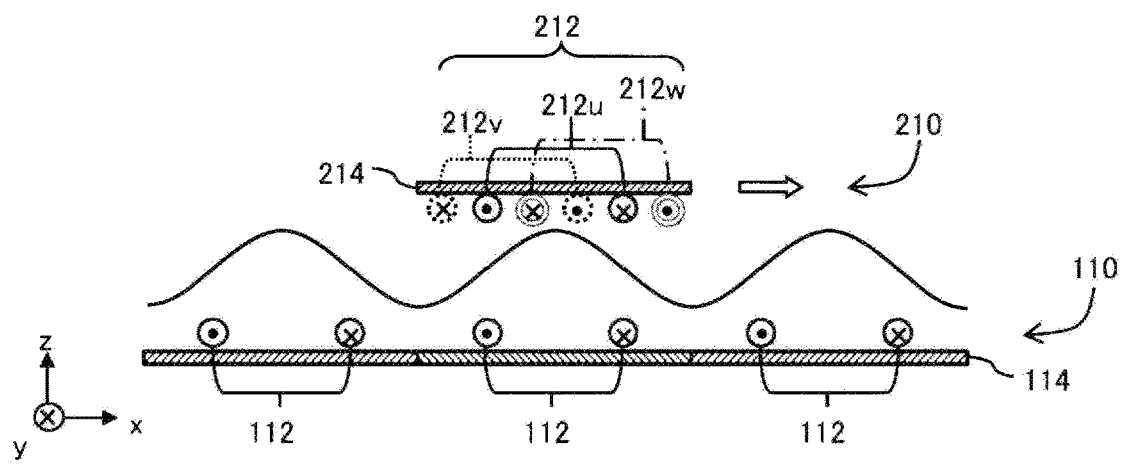
FIG. 3B is a diagram explaining inverter output with a single-phase primary coil and a multi-phase secondary coil.
Figure 3B:
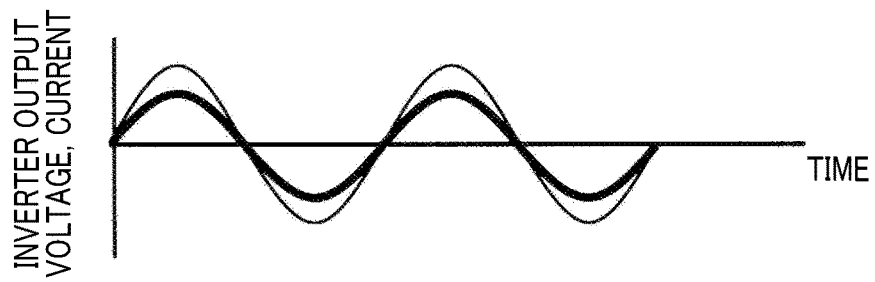

As illustrated by comparison in FIG. 3A and FIG. 3B, a configuration where the primary coil 112 is a single-phase coil and the secondary coil 212 is a multi-phase coil is preferable in terms of inverter efficiency as compared with a configuration where the primary coil 112 is a multi-phase coil and the secondary coil 212 is a single-phase coil. In the coil configuration in FIG. 3A, the primary coil 112 is a three-phase coil and the secondary coil 212 is a single-phase coil. In the coil configuration in FIG. 3B, which is the same as in FIG. 2A, the primary coil 112 is a single-phase coil and the secondary coil 212 is a three-phase coil. At a lower portion of each of FIG. 3A and FIG. 3B, a variation in output voltage and output current from inverters of the power transmitter circuits 120 are drawn.

As a result of the primary coil 112 being a multi-phase coil as in FIG. 3A, coupling coefficients between the phases of the primary coil 112 and the secondary coil 212 differ from each other. In a state in FIG. 3A, a coupling coefficient between a U-phase coil 112u of the primary coil 112 and the secondary coil 212 is high with respect to coupling coefficients between coils 112v and 112w having other phases of the primary coil 112 and the secondary coil 212. A difference in coupling coefficient among a plurality of phases leads to a difference in impedance among the plurality of phases. Thus, even though the same phase voltage is applied to the plurality of phases, the resulting current differs among the plurality of phases and current imbalance occurs. The occurrence of current imbalance causes phase shift, which results in deterioration in power factor of an inverter in each of the power transmitter circuits 120. The deterioration in power factor increases a loss in the inverter.

In contrast, by virtue of the primary coil 112 being a single-phase coil as in FIG. 3B, a power factor of the inverter in each of the power transmitter circuits 120 can be enhanced and a loss in the inverter can be reduced. Further, by virtue of the primary coil 112 being a single-phase coil, the power transmission coil units 110 and the power transmitter circuits 120 are simplified, specifically, the number of elements is reduced and winding form is simplified. This makes it possible to reduce costs. Accordingly, it is preferable that the primary coil 112 be a single-phase coil in terms of simplification of a circuit configuration, and the like. However, by virtue of the primary coil 112 being a multi-phase coil, it is possible to further reduce power ripple as compared with a case where the primary coil 112 is a single-phase coil. Accordingly, the primary coil 112 may be a multi-phase coil in terms of reduction in power ripple.

Figure 4A:
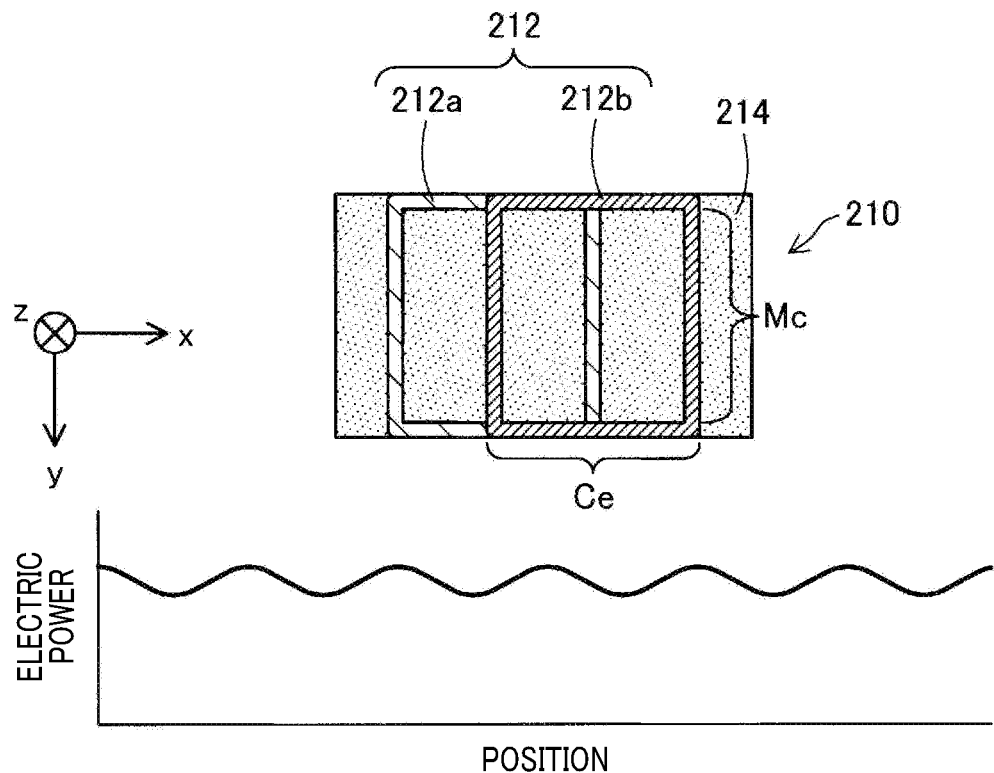
FIG. 4A is a diagram explaining a configuration where a coil end of a two-phase secondary coil is disposed within a front surface region of a magnetic yoke.

When the two-phase secondary coil 212 is viewed in a direction perpendicular to a front surface of the magnetic yoke 214 as illustrated in FIG. 4A, a configuration where a coil end of the secondary coil 212 is disposed within a region of the magnetic yoke 214 is employable. In this example, the B-phase coil 212b is divided into a main coil portion Mc and a coil end Ce. The main coil portion Mc is a coil portion extending along the width direction y of the vehicle 200 and the coil end Ce is a coil portion extending along the front-rear direction x of the vehicle 200. The same applies to the A-phase coil 212a.

Figure 4B:
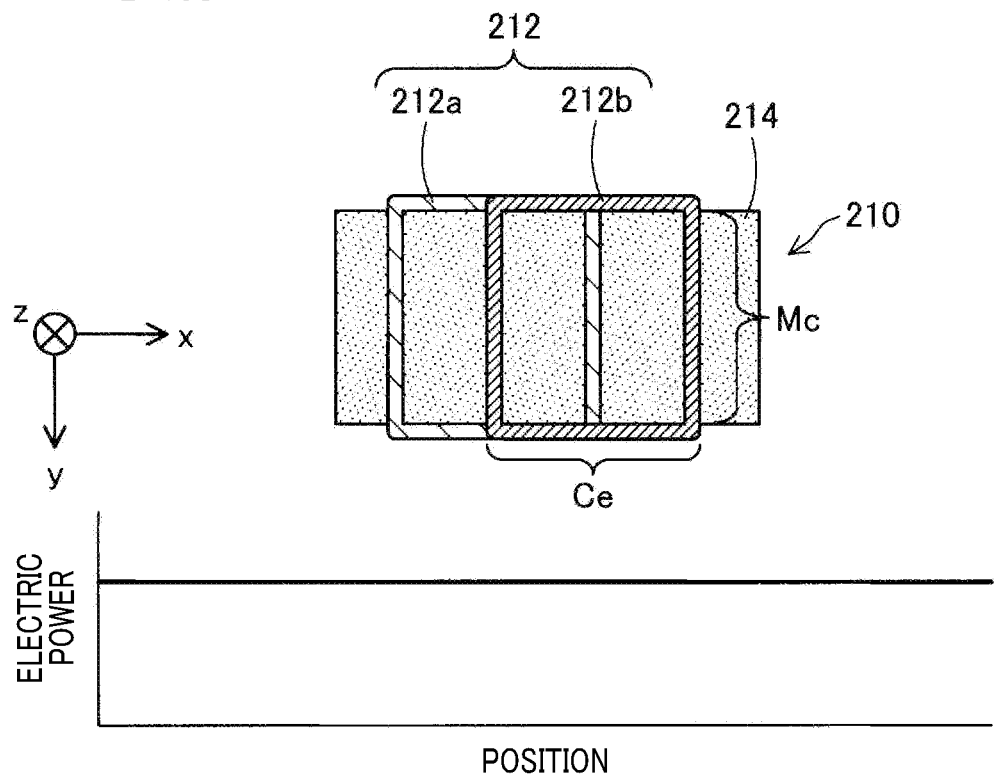
FIG. 4B is a diagram explaining a configuration where the coil end of the two-phase secondary coil is disposed outside the magnetic yoke.

When the two-phase secondary coil 212 is viewed in the direction perpendicular to the front surface of the magnetic yoke 214 as illustrated in FIG. 4B, it is preferable that the coil end Ce of the secondary coil 212 be disposed outside the magnetic yoke 214. By virtue of the coil end Ce being disposed outside the magnetic yoke 214, a magnetic resistance of a magnetic path where a magnetic flux of the coil end Ce passes can be increased to be higher than a magnetic resistance of a magnetic path where a magnetic flux of the main coil portion Mc passes. Here, the "magnetic flux of the coil end Ce" refers to a magnetic flux generated in accordance with a current passing through the coil end Ce. The "magnetic flux of the main coil portion Mc" likewise refers to a magnetic flux generated in accordance with a current passing through the main coil portion Mc. As illustrated in FIG. 4A described above, in the configuration where the coil end Ce is disposed within a front surface region of the magnetic yoke 214, an influence of a mutual inductance between the two coils 212a and 212b on power ripple becomes noticeable, making the power ripple likely to increase. Accordingly, the coil end Ce is disposed outside the magnetic yoke 214 with the magnetic resistance of the magnetic path where the magnetic flux of the coil end Ce passes enhanced. This reduces the influence of the mutual inductance, thus enabling reduction in power ripple.

Figure 5A:
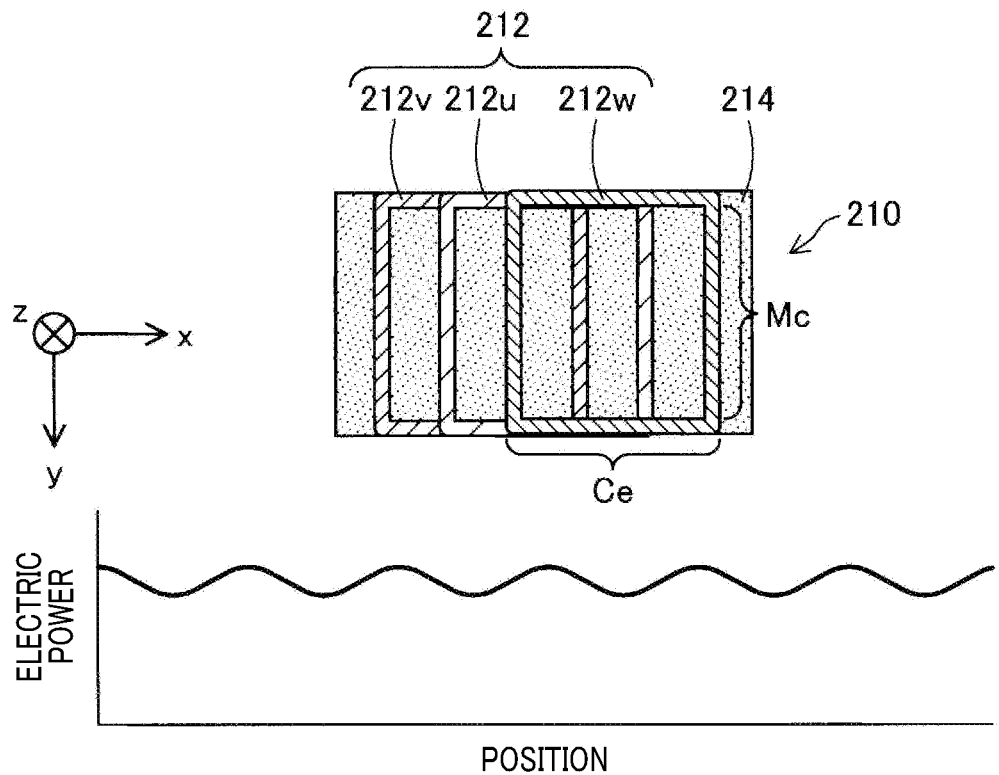
FIG. 5A is a diagram explaining a configuration where a coil end of a three-phase secondary coil is disposed within the front surface region of the magnetic yoke.

As illustrated in FIG. 5A, the configuration where the coil end Ce of the secondary coil 212 is disposed within the region of the magnetic yoke 214 is also employable for the three-phase secondary coil 212.

Figure 5B:
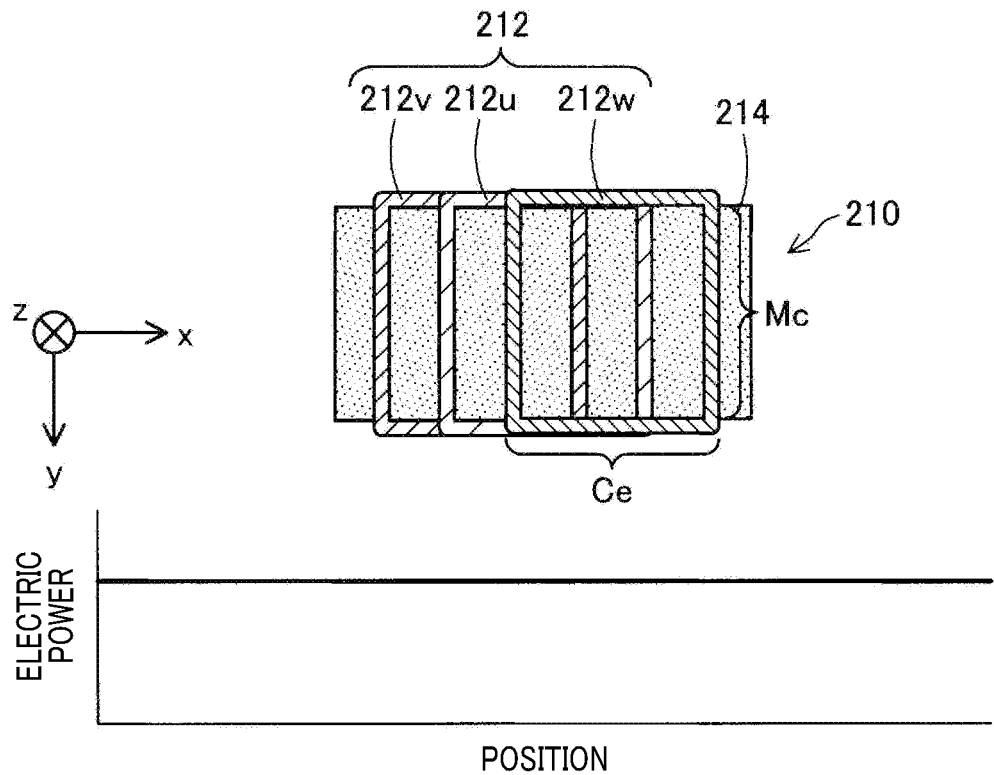
FIG. 5B is a diagram explaining a configuration where the coil end of the three-phase secondary coil is disposed outside the magnetic yoke.

However, as for the three-phase secondary coil 212, it is also preferable that the secondary coil 212 have the coil end Ce disposed outside the magnetic yoke 214 when viewed in the direction perpendicular to the front surface of the magnetic yoke 214 as illustrated in FIG. 5B. By virtue of the coil end Ce being disposed outside the magnetic yoke 214, a magnetic resistance of a magnetic path where a magnetic flux of the coil end Ce passes can be increased to be higher than a magnetic resistance of a magnetic path where a magnetic flux of the main coil portion Mc passes. The three-phase secondary coil 212 as in FIG. 5A also suffers from a phase-to-phase imbalance between mutual inductances of the three coils 212v, 212u, and 212w, which would cause power ripple. Such an imbalance between the mutual inductances is noticeable especially in a case where the three coils 212v, 212u, and 212w are wound in opposite directions in an order of arrangement as in the example in FIG. 2A described above. Accordingly, the coil end Ce is disposed outside the magnetic yoke 214 with the magnetic resistance of the magnetic path where the magnetic flux of the coil end Ce passes enhanced. This reduces the imbalance between the mutual inductances, thus enabling reduction in power ripple.

Such an effect can also be achieved in a case where the number of phases of the secondary coil 212 exceeds three.

As described with reference to FIG. 4B and FIG. 5B, by virtue of the magnetic resistance of the magnetic path where the magnetic flux of the coil end Ce passes being increased to be higher than the magnetic resistance of the magnetic path where the magnetic flux of the main coil portion Mc passes, it is possible to perform power transfer with less power ripple. It should be noted that although the coil end Ce is disposed outside the magnetic yoke 214 in the examples in FIG. 4B and FIG. 5B, the feature that "the magnetic resistance of the magnetic path where the magnetic flux of the coil end Ce passes is higher than the magnetic resistance of the magnetic path where the magnetic flux of the main coil portion Mc passes" may be implemented by a configuration other than this configuration. For example, the feature that "the magnetic resistance of the magnetic path where the magnetic flux of the coil end Ce passes is higher than the magnetic resistance of the magnetic path where the magnetic flux of the main coil portion Mc passes" can be implemented by winding a magnetic shield member on part or the whole of the coil end Ce.

Figure 6:
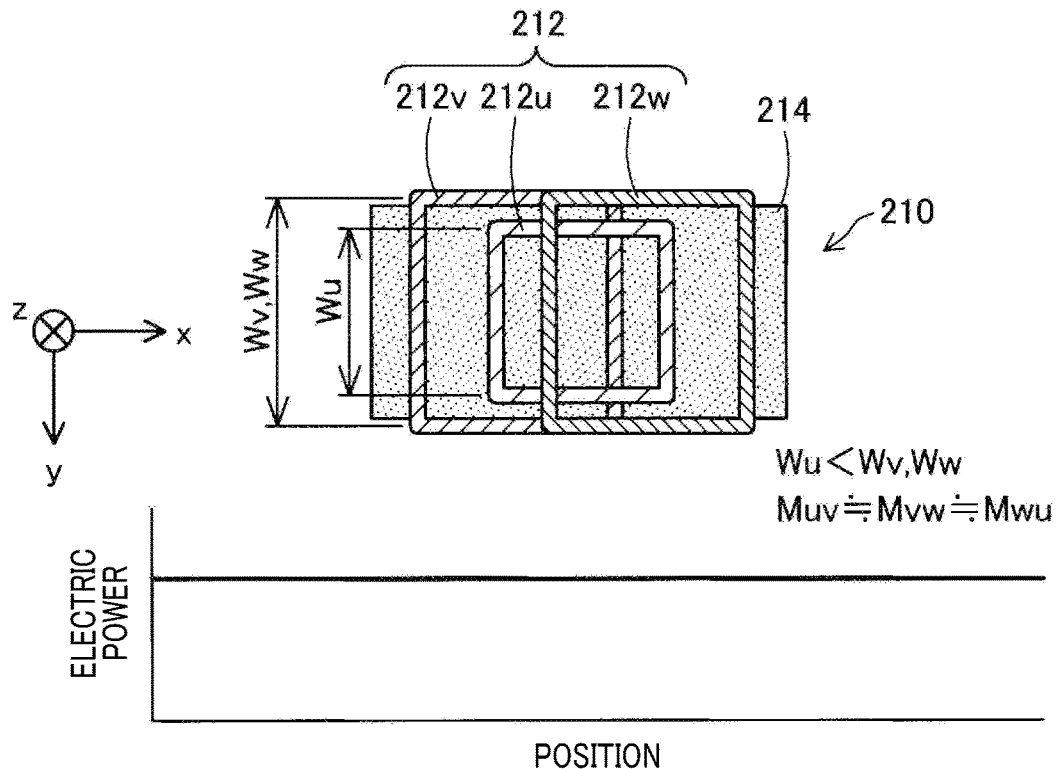
FIG. 6 is a diagram explaining a configuration where a width of a middle coil of the three-phase secondary coil is less than those of the other coils.

As illustrated in FIG. 6, when the three-phase secondary coil 212 is viewed in the direction perpendicular to the front surface of the magnetic yoke 214, a width Wu of the coil 212u, which has a specific phase and is present at an intermediate position, out of the three coils 212v, 212u, and 212w may be set less than widths Wv and Ww of the coils 212v and 212w having other phases. Here, the "width of the coil" refers to a dimension of the coil measured in the width direction y of the vehicle 200. In the example in FIG. 5B described above, a distance between the V-phase coil 212v and the W-phase coil 212w along the traveling direction x of the vehicle 200 is longer than a distance between the U-phase coil 212u and the V-phase coil 212v and a distance between the U-phase coil 212u and the W-phase coil 212w. This makes a mutual inductance Mvw between a V-phase and a W-phase lower than the other mutual inductances Muv and Mwu, which causes power ripple due to a poor balance of the mutual impedances. Accordingly, the width Wu of the coil 212u, which has the specific phase and is present at an intermediate position, is reduced to be lower than the widths Wv and Ww of the coils 212v and 212w having other phases as illustrated in FIG. 6. This reduces the mutual inductances Muv and Mwu, so that the three mutual inductances Muv, Mvw, and Mwu can be balanced to be substantially equal for a reduction in power ripple. Such an effect can also be achieved in a case where the number of phases of the secondary coil 212 exceeds three.

Figure 7:
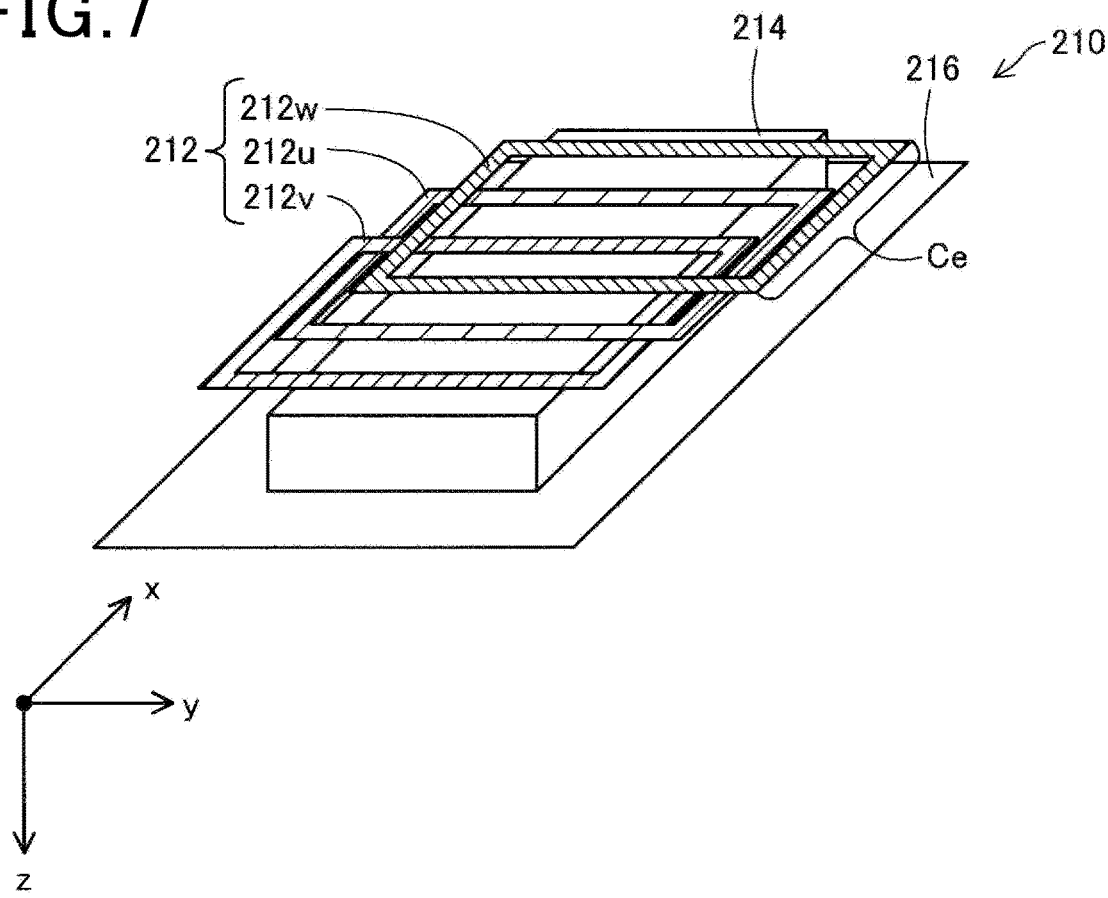
FIG. 7 is a diagram explaining a configuration where coils of the three-phase secondary coil are offset from each other in a width direction.

As illustrated in FIG. 7, a magnetic shield 216 may be provided on a back surface side of the magnetic yoke 214. Here, out of two opposite principal surfaces of the magnetic yoke 214, a principal surface where the coils 212v, 212u, and 212w are disposed is referred to as a "front surface", whereas the opposite principal surface is referred to as a "back surface." It is preferable that the magnetic shield 216 be a sheet-shaped member having a front surface area larger than the magnetic yoke 214. The configuration in FIG. 7 is the same as the example in FIG. 5B described above in that the coil end Ce of each of the coils 212v, 212u, and 212w is provided outside the magnetic yoke 214. However, the example in FIG. 7 is further characterized in that the three coils 212v, 212u, and 212w are offset from each other in the width direction y of the vehicle 200. Employment of such a coil arrangement makes it possible to further balance the three mutual inductances Muv, Mvw, and Mwu, thereby enabling a further reduction in power ripple.

Figure 8A:
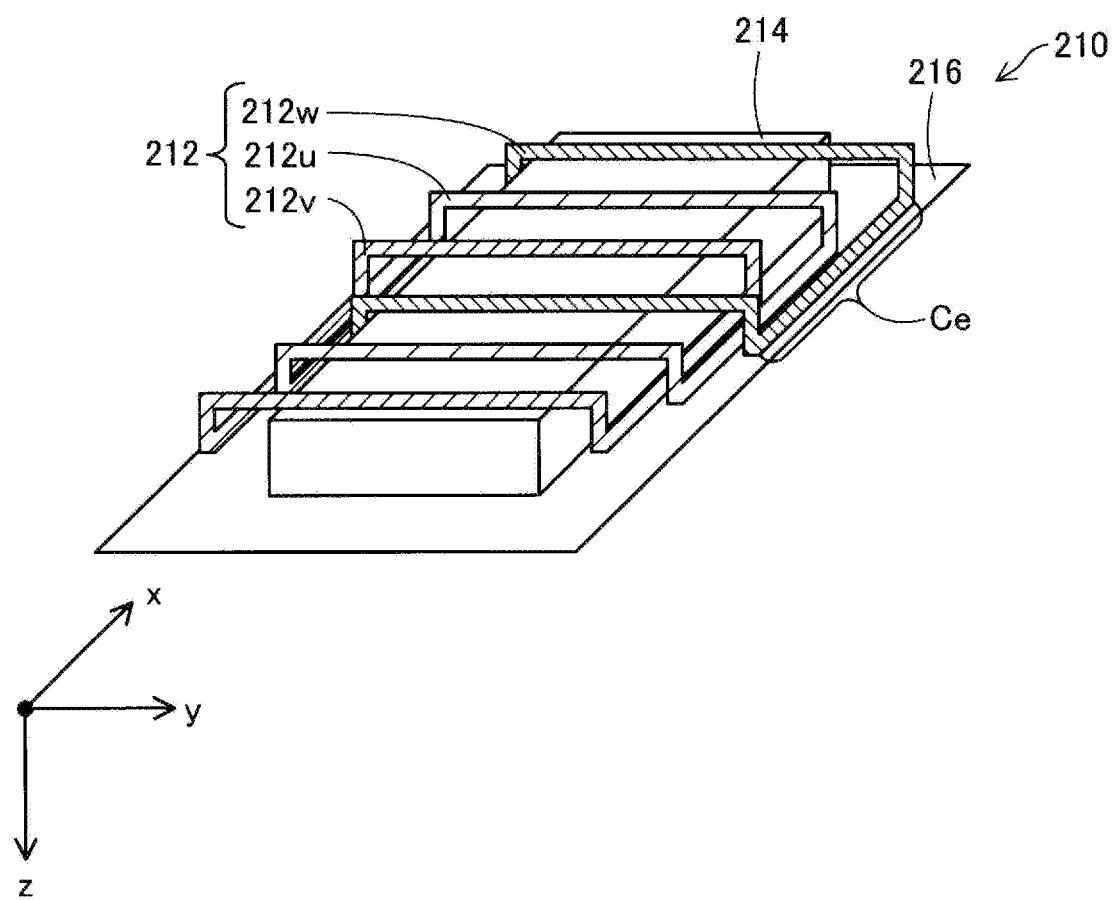
FIG. 8A is a diagram explaining a configuration where the coil end of the three-phase secondary coil is bent toward the magnetic shield.

As illustrated in FIG. 8A, the coil end Ce may be bent outside the magnetic yoke 214 in a direction toward the magnetic shield 216. In this configuration, the magnetic resistance of the magnetic path where the magnetic flux of the coil end Ce passes is further increased. This makes it possible to further balance the three mutual inductances Muv, Mvw, and Mwu, thereby enabling a further reduction in power ripple.

Figure 8B:
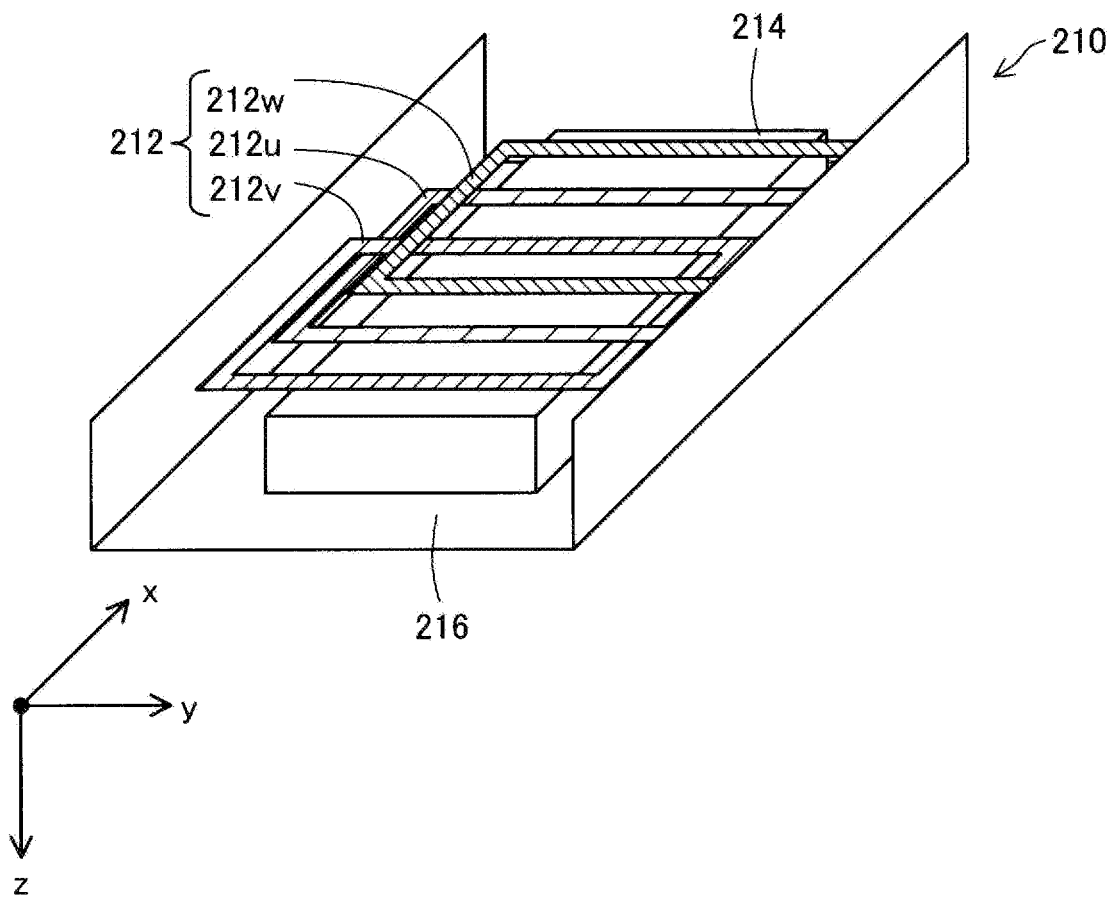
FIG. 8B is a diagram explaining a configuration where the magnetic shield is bent toward the coil end of the three-phase secondary coil.

As illustrated in FIG. 8B, both ends of the magnetic shield 216 may be bent outside the magnetic yoke 214 in a direction toward the coil end Ce. In this configuration, the magnetic resistance of the magnetic path where the magnetic flux of the coil end Ce passes is also further increased as in the configuration in FIG. 8A. This makes it possible to further balance the three mutual inductances Muv, Mvw, and Mwu, thereby enabling a further reduction in power ripple.

Figure 9:
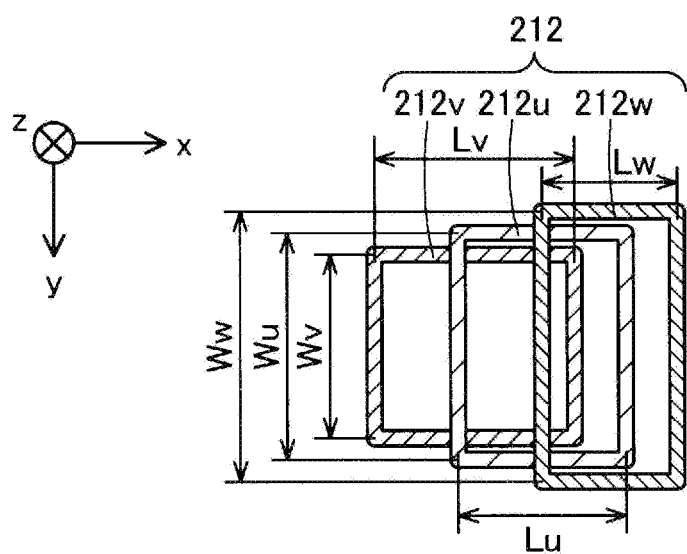
FIG. 9 is a diagram explaining a configuration where lengths and widths of the coils of the three-phase secondary coil are changed in sequence.

As illustrated in FIG. 9, the three-phase secondary coil 212 may be configured such that the widths Wv, Wu, and Ww of the coils 212v, 212u, and 212w, which are measured along the width direction y of the vehicle 200, are gradually increased in an order of arrangement along the front-rear direction x of the vehicle 200. In the example in FIG. 9, the order of arrangement along the front-rear direction x of the vehicle 200 is an order of the V-phase coil 212v, the U-phase coil 212u, and the W-phase coil 212w. Accordingly, the widths of the coils are also increased in this order. In a typical configuration that is frequently employed, coils having respective phases are in the same shape. However, in such a typical configuration, the coils intersect each other in the form of a chain, which disadvantageously makes manufacturability low. In contrast, the configuration where the widths Wv, Wu, and Ww of the coils measured along the width direction y of the vehicle 200 are gradually increased in the order of arrangement along the front-rear direction x of the vehicle 200 as illustrated in FIG. 9 eliminates the necessity for the coils to intersect each other in the form of a chain, so that manufacturability is advantageously enhanced.

The configuration illustrated in FIG. 9 is further characterized in that lengths Lv, Lu, and Lw of the coils, which are measured along the front-rear direction x of the vehicle 200, are gradually decreased in the order of arrangement along the front-rear direction x of the vehicle 200.

By virtue of employing such a configuration, even in a case where other coil configurations described above fail to sufficiently balance the mutual inductances between the phases, it is possible to balance the mutual inductances by adjusting the lengths Lv, Lu, and Lw of the coils. This advantageously enables a reduction in power ripple.

It should be noted that the feature regarding the widths Wv, Wu, and Ww of the coils and the feature regarding the lengths Lv, Lu, and Lw of the coils described with reference to FIG. 9 can be employed independently of each other. Further, these distinguishing configurations are also applicable to a case where the number of phases of the secondary coil 212 exceeds three.

The present disclosure is not limited to the above-described embodiments and may be implemented in a variety of configurations without departing from the spirit thereof. For example, in order to solve a part or all of the above-described problem or achieve a part or all of the above-described effects, the technical features in the embodiments may be appropriately replaced or combined. Further, unless being described to be essential herein, the technical features may be appropriately omitted.

According to an aspect of the present disclosure, there is provided a dynamic wireless power transfer system that performs, through a plurality of primary coils (112) installed along a traveling direction of a road and a secondary coil (212) mounted in a vehicle (200), power transfer to the vehicle while the vehicle is traveling. In the dynamic wireless power transfer system, the secondary coil is an M-phase coil including M coils, M denoting an integer which is two or higher, and the M coils each include a coil end (Ce) extending along a front-rear direction of the vehicle and a main coil portion (Mc) extending along a width direction of the vehicle, the M coils each being configured such that a magnetic resistance of a magnetic path where a magnetic flux of the coil end passes is higher than a magnetic resistance of a magnetic path where a magnetic flux of the main coil portion passes.

The dynamic wireless power transfer system enables power transfer with less power ripple, since the secondary coil is configured such that the magnetic resistance of the magnetic path where the magnetic flux of the coil end passes is higher than the magnetic resistance of the magnetic path where the magnetic flux of the main coil portion passes.

What is claimed is:

1. A dynamic wireless power transfer system configured to perform, through a plurality of primary coils installed along a traveling direction of a road and a secondary coil mounted in a vehicle, power transfer to the vehicle while the vehicle is traveling, wherein
   the system includes a power transmission coil unit and a power receiving coil unit, the power receiving coil unit including the secondary coil which is an M-phase coil including M coils, M denoting an integer which is two or higher, and
   the M coils of the secondary coil each include a coil end extending along a front-rear direction of the vehicle and a main coil portion extending along a width direction of the vehicle, the M coils each being configured such that a magnetic resistance of a magnetic path where a magnetic flux of the coil end passes is higher than a magnetic resistance of a magnetic path where a magnetic flux of the main coil portion passes,
   wherein the power receiving coil unit further includes a magnetic yoke, and the magnetic yoke is disposed behind the secondary coil.

2. The dynamic wireless power transfer system according to claim 1, wherein
   when the M coils are viewed in a direction perpendicular to a front surface of the magnetic yoke, the coil end is disposed outside the magnetic yoke.

3. The dynamic wireless power transfer system according to claim 2, wherein
   the magnetic yoke has a front surface where the M coils are disposed and a back surface opposite to the front surface,
   the secondary coil includes a magnetic shield disposed on the back surface of the magnetic yoke, the magnetic shield having a larger front surface area than the magnetic yoke, and
   the coil end is bent outside the magnetic yoke in a direction toward the magnetic shield.

4. The dynamic wireless power transfer system according to claim 2, wherein
   the magnetic yoke has a front surface where the M coils are disposed and a back surface opposite to the front surface,
   the secondary coil is provided with a magnetic shield disposed on the back surface of the magnetic yoke, the magnetic shield having a larger front surface area than the magnetic yoke, and
   the magnetic shield is bent outside the magnetic yoke in a direction toward the coil end.

5. The dynamic wireless power transfer system according to claim 2, wherein the M coils are offset from each other in the width direction of the vehicle.

6. The dynamic wireless power transfer system according to claim 1, wherein the M coils are configured such that respective widths of the coils measured along the width direction of the vehicle are gradually increased in an order of arrangement along the front-rear direction of the vehicle.

7. The dynamic wireless power transfer system according to claim 1, wherein the M coils are configured such that respective lengths of the coils measured along the front-rear direction of the vehicle are gradually decreased in an order of arrangement along the front-rear direction of the vehicle.

8. The dynamic wireless power transfer system according to claim 1, wherein
   the M denotes an integer which is three or higher, and
   out of the M coils arranged along the front-rear direction of the vehicle, a coil having a specific phase and that is present at an intermediate position has a coil width set less than coil widths of coils having other phases, the coil widths being measured along the width direction of the vehicle.

9. A dynamic wireless power transfer system comprising a wireless power transfer device installed in a road and a vehicle that is to travel on the road, the dynamic wireless power transfer system configured to perform power transfer from the wireless power transfer device to the vehicle while the vehicle is traveling, wherein
   the system includes a power transmission coil unit and a power receiving coil unit, the power receiving coil unit including a coil which is an M-phase coil including M coils, M denoting an integer which is two or higher, and
   the M coils of the coil each include a coil end extending along a front-rear direction of the vehicle and a main coil portion extending along a width direction of the vehicle, the M coils each being configured such that a magnetic resistance of a magnetic path where a magnetic flux of the coil end passes is higher than a magnetic resistance of a magnetic path where a magnetic flux of the main coil portion passes,
   wherein the power receiving coil unit further includes a magnetic yoke, and the magnetic yoke is disposed behind the coil.

* * * * *